United States Patent
Krivosheev et al.

(10) Patent No.: US 9,341,733 B2
(45) Date of Patent: May 17, 2016

(54) METHOD AND APPARATUS FOR DETERMINING THE NATURE OF A MATERIAL IN A CAVITY BETWEEN ONE INNER METAL WALL AND ONE OUTER METAL WALL

(75) Inventors: Sergey Ivanovich Krivosheev, St. Petersburg (RU); Evgeni Lvovich Svechnikov, St. Petersburg (RU); Georgy Petrovich Zhabko, St. Petersburg (RU); Andrey Aleksandrovich Belov, St. Petersburg (RU); Yuri Eduardovich Adamian, Pos. Kuzmolobsky Leningradskaya obl. (RU)

(73) Assignee: FMC Kongsberg Subsea AS, Kongsberg (NO)

( * ) Notice: Subject to any disclaimer, the term of this patent is extended or adjusted under 35 U.S.C. 154(b) by 886 days.

(21) Appl. No.: 13/636,663

(22) PCT Filed: Mar. 24, 2011

(86) PCT No.: PCT/EP2011/054550
§ 371 (c)(1),
(2), (4) Date: Jan. 8, 2013

(87) PCT Pub. No.: WO2011/117355
PCT Pub. Date: Sep. 29, 2011

(65) Prior Publication Data
US 2013/0110403 A1    May 2, 2013

(30) Foreign Application Priority Data

Mar. 26, 2010    (NO) .................................. 20100445

(51) Int. Cl.
*G01V 3/30* (2006.01)
*E21B 47/00* (2012.01)

(52) U.S. Cl.
CPC .............. *G01V 3/30* (2013.01); *E21B 47/0005* (2013.01)

(58) Field of Classification Search
USPC .......................................................... 702/7
See application file for complete search history.

(56) References Cited

U.S. PATENT DOCUMENTS

| 3,752,257 A | 8/1973 | Davis |
| 3,883,841 A | 5/1975 | Norel et al. |
| 2001/0028602 A1* | 10/2001 | Dubois ................... G01V 1/02 367/140 |
| 2005/0205268 A1 | 9/2005 | Engels et al. |
| 2006/0198243 A1 | 9/2006 | Tang et al. |
| 2007/0131417 A1 | 6/2007 | Bolshakov et al. |
| 2009/0231954 A1 | 9/2009 | Bolshakov et al. |
| 2010/0162818 A1* | 7/2010 | David ................... G01N 22/04 73/592 |

* cited by examiner

*Primary Examiner* — Tung S Lau (57) ABSTRACT

The invention relates to a method and apparatus for determining the nature of a material in a cavity between one inner metal wall and one outer metal wall provided outside the inner metal wall. First a tool is located on the inside of the inner metal wall, where the tool comprises a pulse generator and a signal recorder. An electromagnetic short duration pulse is generated by means of the pulse generator, the pulse inducing mechanical vibrations in the walls. Data representing the reflections of the mechanical vibrations from said cavity is recorded by means of the signal recorder. The recorded data is analyzed to determine the nature of the material in the cavity.

16 Claims, 6 Drawing Sheets

METHOD AND APPARATUS FOR DETERMINING THE NATURE OF A MATERIAL IN A CAVITY BETWEEN ONE INNER METAL WALL AND ONE OUTER METAL WALL

FIELD OF THE INVENTION

The present invention relates to a method and apparatus for determining the nature of a material in a cavity between one inner metal wall and one outer metal wall provided outside the inner metal wall. The metal walls are typically casing strings of a subsea well, where the method and apparatus is used to measure the integrity of the cement bonding with the casing strings and the presence (or absence) of cement in the annulus between casing strings.

BACKGROUND OF THE INVENTION

Cavities are often filled with a material for insulation or other purposes. In one instance this can for example be a tank with double walls where the cavity between the walls is filled with cement or other hardening material. In another instance it can be a special purpose building, for example a power station having walls where the cavity is filled with cement. Some times it may be necessary to ascertain the quality of the filling but where there are difficulties due to inaccessibility or safety reasons.

One typical example of such a cavity is the annular space between the casing strings of a hydrocarbon well. A typical hydrocarbon well construction consists of a large diameter pipe called a conductor and within that successive pipes called casing strings that are installed in the well as the drilling progresses. When drilling the well first a shallow hole (~100 meters) is drilled and a pipe, called conductor pipe, is lowered into the hole. Cement is then pumped down the pipe and allowed to flow up in the space between the conductor pipe and the surrounding ground. Then the hole is drilled further down and a second casing, called surface casing and normally 20 inches nominal diameter, is installed in the well and the annular space between the surface casing and the borehole (in the open part of the hole) and the conductor pipe is also filled with cement. Then, depending on the length of the hole drilled, and the rock structure, successive casing strings with diminishing diameters are introduced into the borehole and hung off from the wellhead. These casings are normally cemented only partway up from the bottom of the borehole. Lastly, production tubing is installed into the well down to the producing formation and the casings are perforated to allow fluids to enter the well to flow up through the tubing and through the Christmas tree into a flowline.

When cementing each pipe the normal practice is to calculate the amount of cement needed, based on the annular space and the length of the space designed to be filled. However, it is often difficult to calculate the exact amount of cement needed and the cement level may be lower than intended. In the case of surface casing it is desirable to fill the annular space all the way up to the mudline (seabed), but this may not always be achieved, leading to so-called cement shortfall. The top of the surface casing may therefore be filled with a fluid (water or brine) instead of cement resulting in that the surface casing string is not bonded to the conductor pipe all the way up to the mudline. In such a case the part of the surface casing that is not cemented can be regarded as a free-standing column that, if subjected to loads, can be damaged.

The surface casing carries a wellhead and is the principal load-carrying structure for the equipment mounted on top of the wellhead. It serves both the purpose of being a foundation for external loads, such as production equipment (Christmas tree) and for borehole support against the formation. A well will be subjected to various loads during its lifetime. In for example a workover situation, a BOP and riser is attached to the Christmas tree, the riser extending to the surface. The movements of the riser and the use of drilling equipment can set up cyclic loads in the wellhead and the surface casing string (See FIGS. 1 & 2). This may induce fatigue in the casing string.

Another cause of loads comes from the casing strings being subjected to loads from being heated by the producing fluids.

If the cement has filled the annular space completely and, in addition, has bonded properly with the steel pipe cyclic loads will be spread along the length of be casing and transferred to the conductor pipe and the ground. However, if there is a length that has not been properly filled that part of casing can act as a free-standing column (ref. above) and cyclic loads can lead to fatigue and damage of the casing. It is also possible that the point where the top of cement level is can act as a breaking point because of the movements of the column above.

Similarly, heating and cooling of the casing may induce loads that can lead to fatigue problems and deformation of the casing.

As can be understood from the above it is therefore of prime interest to find out if the cement job is properly executed, e.g. the annular space is properly filled. The main purpose of the invention is therefore to find out if there is cement between the surface casing and the conductor and especially the level of the cement from which the length of the column can be determined.

If later work has to be performed on the well the BOP and riser is reattached to the Christmas tree so that operations can be carried out in a safe manner.

Both during drilling and (if necessary) workover operations the wellhead is subjected to external loads, as explained above. How this affects the wellhead depends on the length of the free standing column. A longer column will be more vulnerable to fatigue. If the length of the free standing column can be determined it can be calculated how much load the wellhead can be subjected to and this will in turn determine how much work that can be done. This enables an operator to predict the operational lifetime of the well and to ensure the integrity of the well structure.

There are known several methods and systems for non-destructive inspection of layers of different materials. Some of these methods are based on first generating electric, electromagnetic or acoustic signals and thereafter measure the different reflections of the generated signals from the layers. These methods and systems have not been used for inspection of subsea wells. One reason for this is the difficult access to the well through the central pipe. Moreover, the well represents a challenging measuring environment due to presence of hydrocarbon fluids and/or water, the temperature and pressure may vary widely and/or the central pipe may be exposed to significant clogging and corrosive wear.

There is also a challenge to create a signal that is strong enough to penetrate through several different layers and to read signals that have been reflected from the various layers. As is readily understood, the further away the reflections are the weaker the signals will be.

The object of the invention is therefore to provide a Method and apparatus for determining the nature of a material in a cavity between one inner metal wall and one outer metal wall Moreover, it is an object of the invention to provide a method and system where a tool may be lowered into the well inside the inner metal wall, for example the production tubing, for performing the operation.

There is also an object of the invention to determine the level of the cement, i.e. the depth of the top of cement and from that calculate the length of the free standing column.

SUMMARY OF THE INVENTION

The invention relates to a method for determining the nature of a material in a cavity between one inner metal wall and one outer metal wall provided outside the inner metal wall, where the method comprises:
  locating a tool on the inside of the inner metal wall, the tool comprising a pulse generator and a signal recorder;
  generating an electromagnetic short duration pulse by means of the pulse generator, the pulse inducing mechanical vibrations in the walls;
  recording data representing the reflections of the mechanical vibrations from said cavity by means of the signal recorder;
  analyzing the recorded data to determine the nature of the material in the cavity.

In one aspect, the cavity between the inner metal wall and the outer metal wall is the annular space between casing strings in a hydrocarbon well.

In one aspect, the material of which nature is to be determined is either cement or water.

In one aspect, further metal was are provided outside the outer metal wall, there are further cavities between the outer metal wall and the further metal walls, and the method comprises:
  recording data representing the reflections of the mechanical vibrations from the further cavities by means of the signal recorder;
  analyzing the recorded data to determine the nature of the material in the further cavities.

In one aspect, the method comprises repeating the generating, recording and analyzing steps for different levels in the well to determine a boundary between cement and water.

In one aspect, the electromagnetic signal comprises an electromagnetic pulse with duration of less than 200 µs.

In one aspect, the electromagnetic signal comprises an electromagnetic pulse with duration of 4 µs.

In one aspect, the energy of the electromagnetic signal is 0.1 kJ-3.0 kJ.

In one aspect, the method is performed without physical contact between the pulse generator and the wall and/or between the signal recorder and the wall.

In one aspect, the signal generator comprises an inductor.

In one aspect, the inductor has an inductance of $10*10^{-6}$ H–$40*10^{-6}$ H.

In one aspect, the method comprises supplying energy to the signal generator by means of a capacitor.

The invention also relates to an apparatus for determining the nature of a material in a cavity between one inner metal wall and one outer metal wall provided outside the inner metal wall, where the apparatus comprises a tool having a tool housing and means for suspending the tool into the well, the tool comprising:
  a pulse generator for generating an electromagnetic short duration pulse, the pulse inducing mechanical vibrations in the walls;
  a signal recorder for recording data representing reflections of the mechanical vibrations from said cavity;

and where the apparatus further comprises an analyzing device connected to the tool, for analyzing the recorded data to determine the nature of the material in the cavity.

In one aspect, the cavity between the inner metal wall and the outer metal wall is the annular space between casing strings in a hydrocarbon well.

In one aspect, the material of which nature is to be determined is either cement or water.

In one aspect, further metal was are provided outside the outer metal wall, there are further cavities between the outer metal wall and the further metal walls, where the signal recorder is configured to record data representing the reflections of the mechanical vibrations from the further cavities, and the analyzing device analyzes the recorded data to determine the nature of the material in the further cavities.

In one aspect, the apparatus comprises a cable for power and signal communication between the tool and a topside control station.

In one aspect, the pulse generator comprises an inductor for generating the electromagnetic pulse.

In one aspect, the inductor has an inductance of $10*10^{-6}$ H–$40*10^{-6}$ H.

In one aspect, the pulse generator comprises a capacitor connected to the inductor, where the capacitor is configured to discharge its energy over the inductor.

In one aspect, the generator comprises a switch connected between the inductor and the capacitor.

In one aspect, the capacitor is charged by means of a power supply via the cable.

BRIEF DESCRIPTION OF THE DRAWINGS

In the following, embodiments of the invention will be described in detail with reference to the enclosed drawings, where.

DETAILED DESCRIPTION OF THE INVENTION

Figure 1:
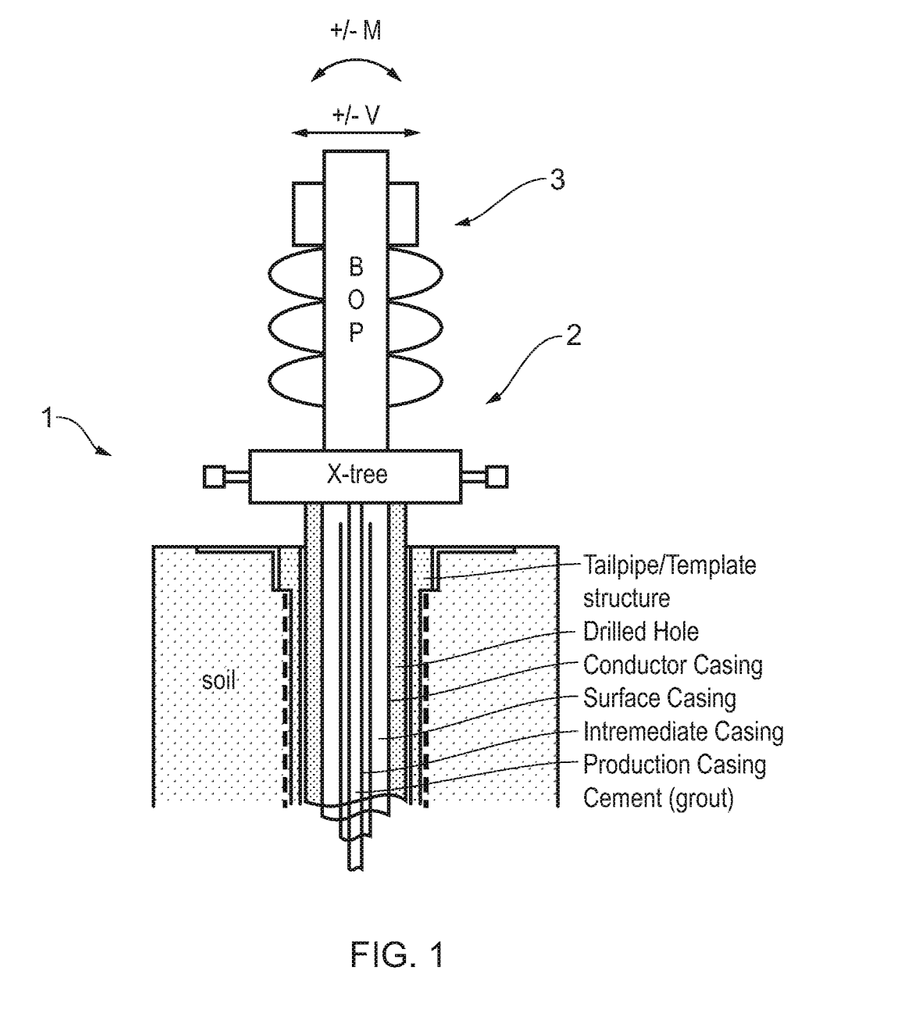
FIG. 1 illustrates how a well may be supported by the seabed.

In FIG. 1 there is shown an illustrative embodiment of the upper part of a completed hydrocarbon well 1. There is shown the various types of casing strings that are installed in the drilled hole. The different casings may for example be as in FIG. 1, comprising:
Tailpipe/template structure
Conductor casing
Surface casing
Intermediate casing
Production casing These casings are made of metal. In FIG. 1, the production casing is an inner metal wall, and the intermediate casing is an outer metal wall provided outside the inner metal wall. The remaining casings are further metal walls provided outside the outer metal wall, i.e. the intermediate casing.

One cavity is provided between the inner metal wall and the outer metal wall. Further cavities are provided between the outer metal wall and the further metal walls.

Cement is provided to support the casing strings in relation to each other. As mentioned above, there might be an insufficient amount or level of cement in the different cavities, and hence, the cavities may be partially filled with seawater instead.

Hence, cement is normally provided between the drilled hole and the conductor casing, and between the conductor casing and the surface casing. As mentioned above the annular space between the conductor and the surface casing should ideally be filled with cement all the way to the wellhead. The annular space between the other casings is normally only filled partway with cement, the amount determined by the formation characteristics. It should be noted that there may be used more than these casings for the foundation of the well, depending on the seabed properties etc.

In FIG. 1 it is also shown a Christmas tree 2 on top of the surface casing. The BOP-stack 3 is attached to the Christmas tree 2.

Figure 2:
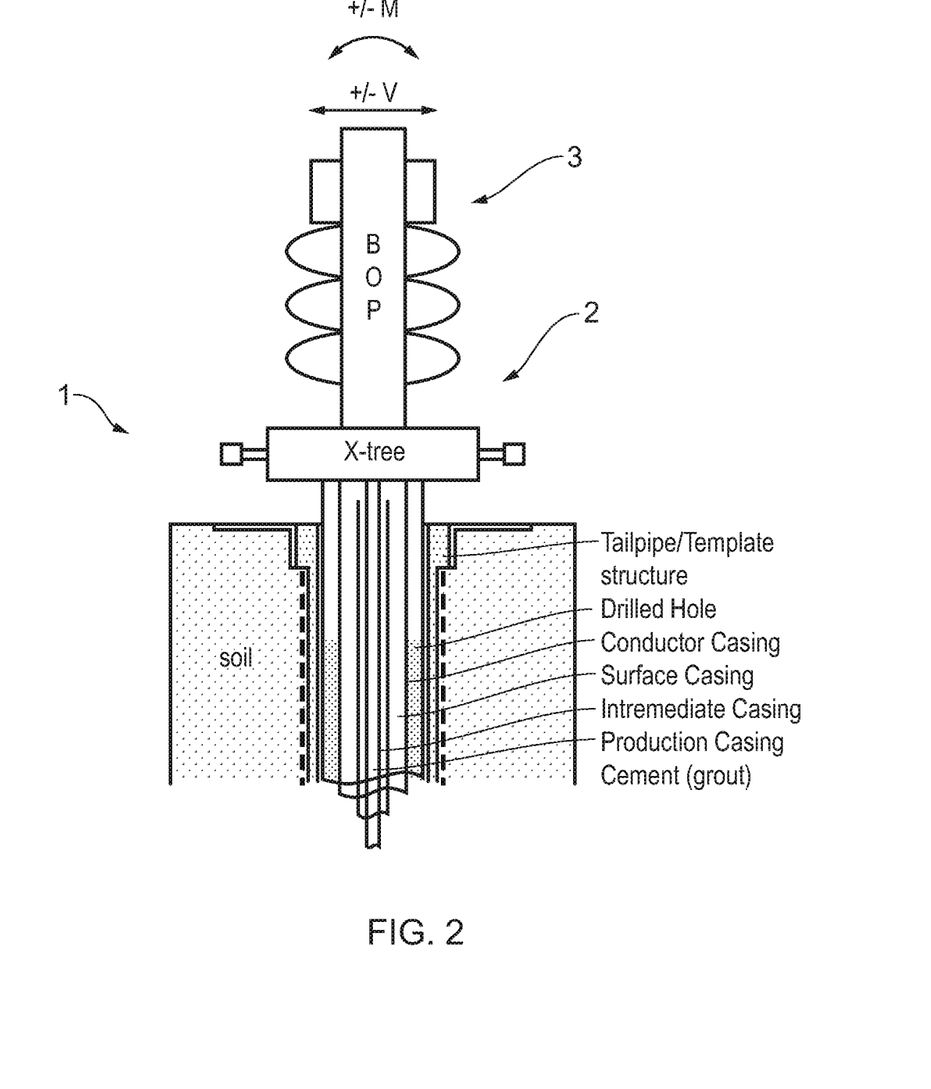
FIG. 2 illustrates the well of FIG. 1, where some of the cement is lacking in some gaps between the casing pipes.

In FIG. 2 there is shown an example of a completed well where the annulus between the surface casing and the conductor casing is not completely filled with cement. As mentioned above, the object of the invention is to determine if the annulus is acceptably filled with cement (as in FIG. 1) or if not (as in FIG. 2).

The theoretical background for how physical vibrations propagate in different mediums and how they are reflected from different mediums are well known for a skilled person.

Figure 3:
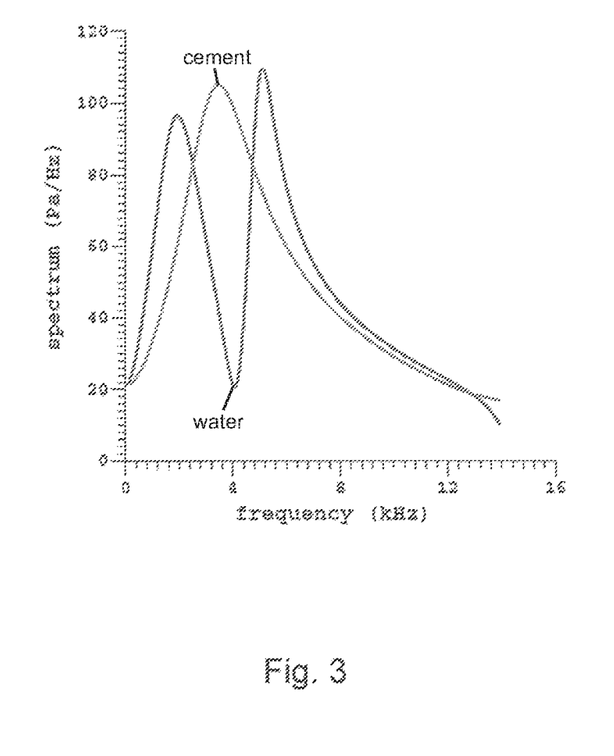
FIG. 3 illustrates a simulated curve for vibrations at different frequencies.

In FIG. 3, two simulated examples of the reflection spectra for reflections from a cement-containing structure and a water-containing structure are respectively shown for frequencies between 0 kHz-16 kHz. As shown, it is possible to determine whether the material in the structure is cement or water based on the spectrum value for frequencies around 4 kHz.

However, for structures with several casings outside each other, the reflected spectra becomes more complex, especially when trying to determine the material between the third and fourth casings (i.e., the surface casing and the conductor casing or between the fourth and fifth casings (i.e., the conductor casing and the tailpipe).

Figure 4:
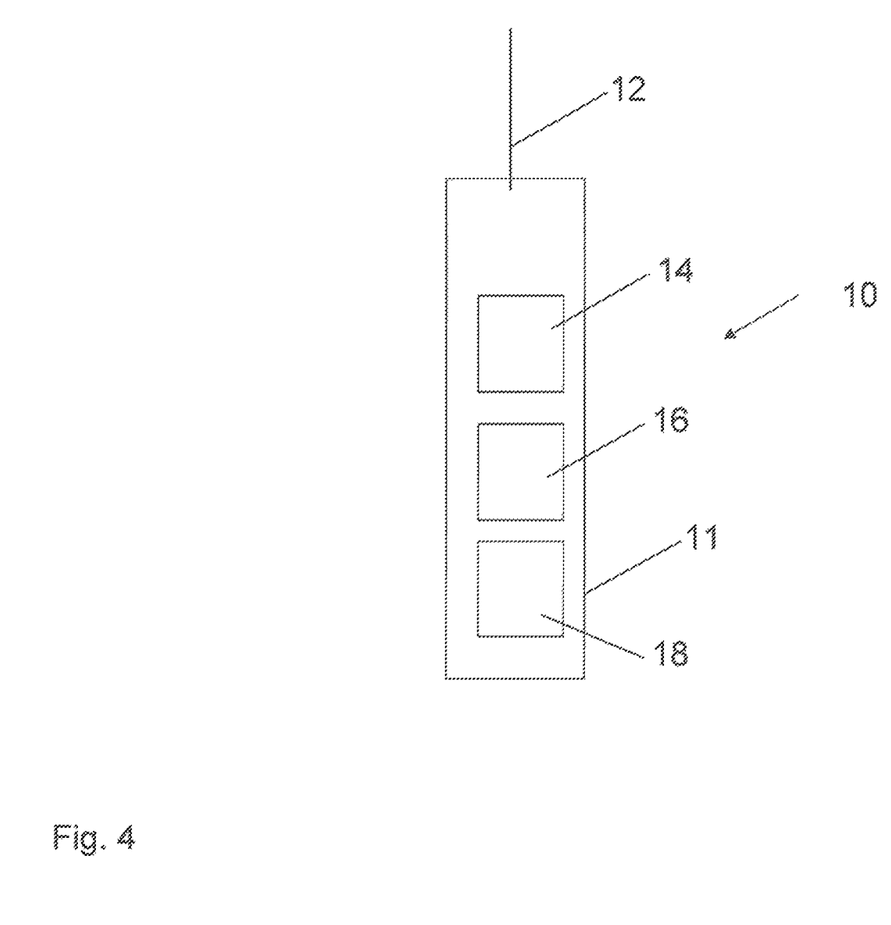
FIG. 4 illustrates a schematic view of an inspection device according to the present invention.

In accordance with the present invention, an apparatus is provided to determine the nature of the material in the cavities. As shown in FIG. 4, the apparatus comprises a tool 10 which is designed to be lowered into the subsea well 1. The tool 10 comprises a housing 11 attached to a cable 12 for suspending the tool 10 in the well. The cable comprises means for transferring signals/power between the tool 10 and topside equipment (not shown).

The tool comprises a pulse generator 14 for generating an electromagnetic short duration pulse, which due to the magnetic properties of the pipe will cause the pipe to vibrate. Hence, the pulse induces mechanical vibrations in the walls. The tool also comprises a signal recorder 16 for recording data representing reflections of the mechanical vibrations from said cavity.

The apparatus further comprises an analyzing device (not shown). The analyzing device may be located topside as a part of the topside equipment, i.e. above the well, and is then connected via the cable 12. Alternatively, the analyzing device may be located within the tool housing 11. The analyzing device is connected to the tool, for analyzing the recorded data from the recoding device to determine the nature of the material in the cavity.

Figure 5:
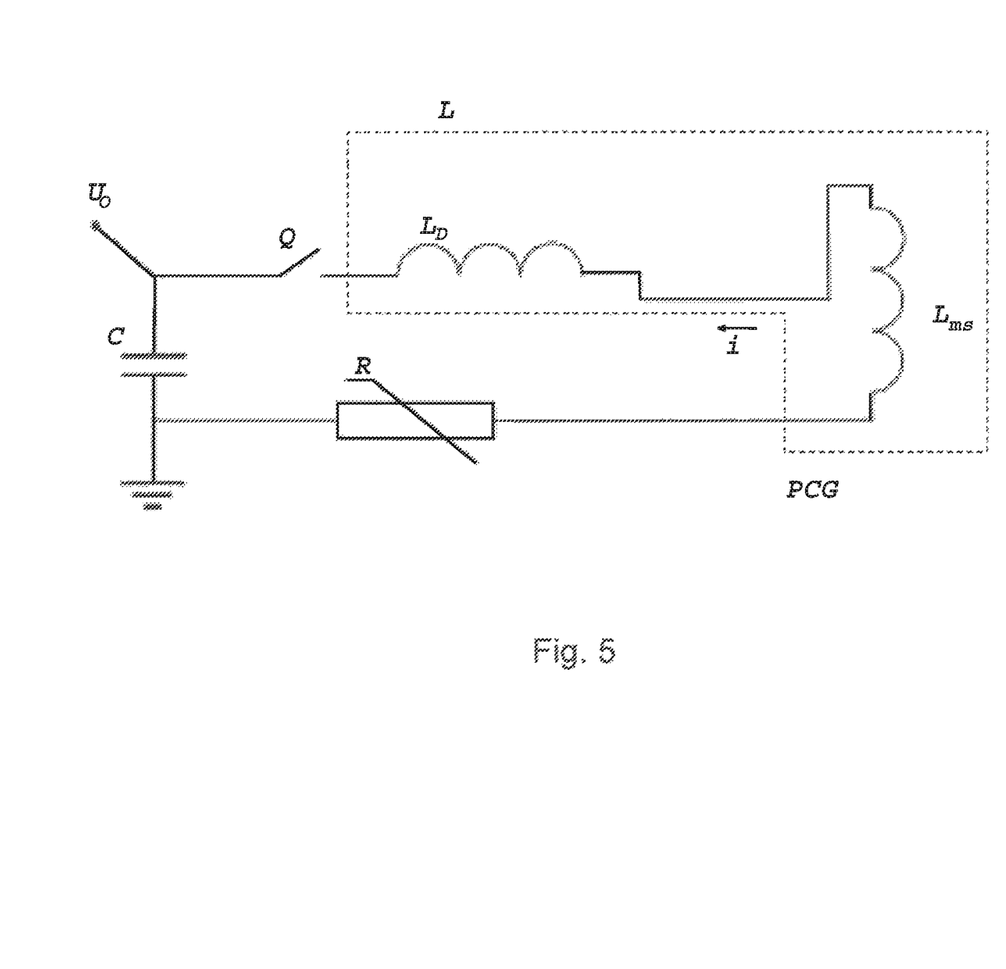
FIG. 5 illustrates an embodiment of the signal generator.

In FIG. 5 there is shown a schematic drawing of a preferred embodiment of the pulse generator. The generator 14 comprises a charging device, for example a power supply represented by the voltage Uo for charging an energy storage device, for example a capacitor C. The capacitor C is connected to a series connection of a switching device Q, a magnetic device L and a resistor device R.

The charging device may for example be a power supply located topside and being connected to the capacitor C through the cable 12. The charging device is considered known for a skilled person and will not be described in detail here.

The switching device is for example a semiconductor switch, which is trigged manually or automatically according to a predetermined pattern, for example when the voltage across the capacitor has reached a specific threshold value.

In the schematic diagram of FIG. 5, the magnetic device L consists of an inductor Lms. The inductor comprises a number of coils, the number determining the electromagnetic discharge characteristics.

The resistor device R is preferably a non-linear resistor, having an abrupt drop in its specific resistance in case of increase of the current density of the current flowing through it. The drop of voltage on the non-linear resistance $U_R$ is related to the current I in the following way:

$$U_R = a_0 \cdot h_R \cdot \left|\frac{I}{S_R}\right|^\alpha \cdot \text{sign}(I), \quad (5.3)$$

where $a_0$ and $\alpha$ are the parameters of material, $h_R$ and $S_R$ are the height and the section of the resistance, respectively.

The requirements of the elements of the signal generator 14 will depend on the desired parameters of the generated electromagnetic signal and the characteristics of the magnetic system. This is well known to persons skilled in the art.

The signal recorder 16 may comprise gauges for registering the acoustic signal caused by the physical vibration of the pipes in the well caused by the electromagnetic pulse. As an example, the gauges may have the following properties:
- an upper boundary of frequency range of measurements not lower than 10 kHz
- possibility of measurement of pressure variations around $10^3$ Pa against the background of static pressure of $10^7$ Pa.
- to be able to operate in a hydrocarbon well with temperatures up to 150° C.

It should be noted that other signal recorders also may be used, such as piezoelectric pressure sensors, capacitance based pressure sensors, tensometric pressure sensors, optical pressure sensors and/or hydrophones.

The analyzing device 18 may comprise one or several filters, amplifiers, an AC/DC converter and a processor for performing the signal analysis. The hardware of the analyzing device is considered known for a person skilled in the art.

In use, the pulse generator is charged up and when the switch is closed the inductor will discharge an electromagnetic pulse. The pulse will transmit to the pipe and set the pipe in vibration. This vibration excites from the pipe and propagates as pressure pulses through the layers of pipes. As it reaches each layer the pipes will be set in motion and this motion creates acoustic waves that will be reflected back and be recorded by the signal recorder.

This created force results in an interaction between the magnetic field and the currents induced in the conducting environment. The source of magnetic field (the coil) together with the conducting environment forms a magnetic system. The magnetic system can be selected in such a manner that a zone with uniform current distribution is formed in the conducting environment. In this zone there is an unequivocal relation between the pressure formed in the conducting environment, the current, and geometrical parameters of the coil. It is obvious, that spatial characteristics of the force field are determined by the geometry of magnetic system, and time-depending parameters of the acting pressure are determined by the characteristics of the current flowing in the magnetic system.

During experiments it has been found that the noise in the recorded signal may be reduced by reducing the length of the generated signal, i.e. generating a signal with an extremely short duration.

The advantage of small durations of the sounding pulse consists of using the short-wave part of the spectrum for diagnostics and a small duration of the signal measurement.

Several tests have been performed, using different values and parameters:

Voltage Uo: 3 kV-15 kV
Capacitor C: Capacitance $C=10*10^{-6}$ F–$100*10^{-6}$ F
Magnetic device L: Inductance $L=10*10^{-6}$ H–$40*10^{-6}$ H
Switch Q: Semi-conductor commutators, gas-discharge commutators or pseudo spark commutators may be used.

The method for performing an operation in a hydrocarbon well will now be described. First, the device 10 is lowered into the well. As described above, the device 10 comprises a pulse generator 14 and a signal recorder 16. Then an electromagnetic signal is generated by means of the signal generator.

The tool is lowered into the well and suspended in the production tubing. It may be arranged such that it is placed in contact with the surface of the pipe but that is not a prerequisite for the function.

Initially, the switch is turned off. The voltage Uo is applied over the capacitor C for charging the capacitor until a voltage of 3 kV-15 kV is achieved, as mentioned above. The voltage Uo is applied via the wire 12. When fully charged, the switch is turned on, and the capacitor will discharge by supplying a current I through the magnetic device L and the resistor R. During tests, the switch was turned on for periods between 20 μs-200 μs. Even shorter periods of 4 μs-20 μs have also been tested. This short duration is achieved by the geometry of the coil. The duration of the pulse depends on the inductivity of the coil, which may be reduced by using fewer turns in the winding of the coil. The inductivity also depends on the winding dimensions. At a fixed value of energy storage capacity, a reduction in inductance results in shorter pulse duration.

The current I will, with the values given above, have an instant value of 5 kA-20 kA. The current through the magnetic device L will generate an electromagnetic signal pulse which will result in mechanical vibrations of the pipes in the well. During the tests, the best results were achieved with an energy of the electromagnetic signal of 0.1 kJ-3 kJ.

Data representing the mechanical vibrations in the well is then recorded by means of the signal recorder. The recorded data is transferred to the analyzing device 18 for performing the analysis. The output from the analyzing device may be one or several curves showing indications of the material between the different casings.

Figure 6:
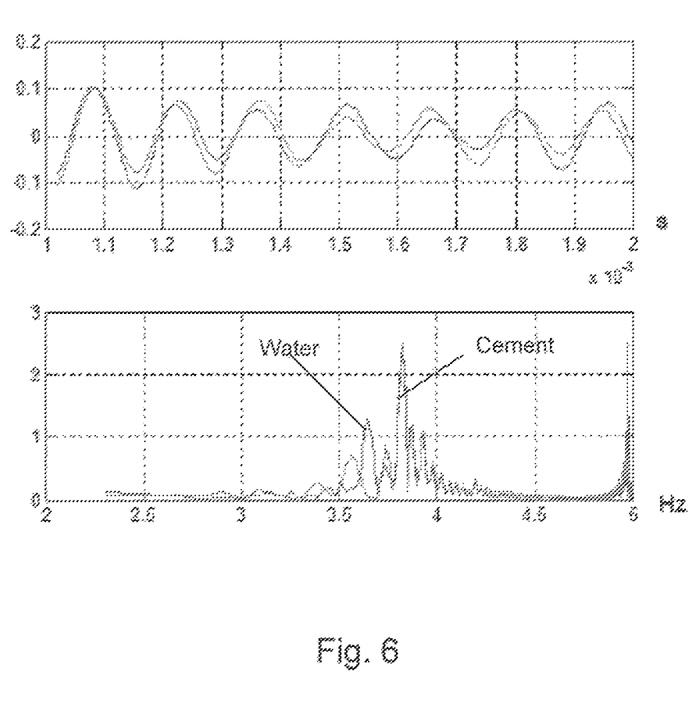
FIG. 6 illustrates test results of one of the embodiments of the invention.

FIG. 6 shows the results of one of the tests. The upper curves are the signal being registered by the signal recorder, and the lower curves are their spectrum for a test setup for filling of a distant gap with cement and with water respectively. As shown, it is possible to distinguish between the curves for frequencies in the area between 3.5 kHz-4 kHz.

The short duration signal pulses results in shorter signals being reflected. Hence, it is easier to distinguish the reflections from the different structures from each other. Moreover, the distance between the different structures, i.e. the diameter of the different casings, are known. Hence, it is possible to predict when the reflection wave from the different casings will return to the signal recorder, and this information may also be used to analyze the recorded signal.

In practice, the inspection device may then be moved to another level or depth in the well, and the steps of generating; recording and analyzing may be repeated for detecting whether or not cement is present in the different gaps between the casings for this level. In this way, the level of cement between the surface casing and the conductor can be determined. In this way, the height of the free-standing column (pipe) will be known. Using this data, together with the physical properties of the pipe, it can be calculated what bending loads may be permissible and an analysis performed that will be used to determine how much can be done on a well without compromising the structural integrity of the wellhead.

If the cement has not bounded properly to the pipe there will be a small gap between the pipe and the cement in the annular space. The result of that is that the pipe may be able to move more freely, as for example during heat expansion. Even in intermediate casing strings this may cause unwanted loads in the wellhead or it may cause the casing hanger to move out of position and possibly create a leakage path into the wellhead. The tool may also be used to identify such gaps between intermediate pipes and the short duration pulses will enable the device to even identify such small gaps.

The invention claimed is:

1. A method for determining the nature of a material in a cavity between one inner metal wall and one outer metal wall provided outside the inner metal wall, the inner metal wall being a production casing extending into a well and the outer metal wall being an intermediate casing surrounding the production casing, wherein further metal walls are provided outside the intermediate casing, one cavity is provided between the inner metal wall and the outer metal wall, and further cavities are provided between the outer metal wall and successive ones of the further metal walls, the method comprising:

locating a tool on the inside of the inner metal wall, the tool comprising a pulse generator and a signal recorder;

generating an electromagnetic short duration pulse by means of the pulse generator to thereby induce mechanical vibrations in the walls, the electromagnetic short duration pulse having a duration of less than 200 μs and an energy of 0.1 kJ 3.0 kJ;

recording data representing the reflections of the mechanical vibrations from said cavity and the further cavities by means of the signal recorder; and analyzing the recorded data to determine the nature of the material in the cavity and in the further cavities.

2. The method according to claim 1, where wherein the material whose nature is to be determined is either cement or water.

3. The method according to claim 2, further comprising repeating the generating, recording and analyzing steps for different levels in the well to determine a boundary between the cement and the water.

4. The method according to claim 1, wherein the electromagnetic pulse has a duration of 4 μs.

5. The method according to claim 1, wherein the method is performed without physical contact between the pulse generator and the inner wall and/or between the signal recorder and the inner wall.

6. The method according to claim 1, wherein the signal generator comprises an inductor.

7. The method according to claim 6, wherein the inductor has an inductance of $10*10^{-6}$ H–$40*10^{-6}$ H.

8. The method according to claim 1, wherein the method comprises supplying energy to the signal generator by means of a capacitor.

9. An apparatus for determining the nature of a material in a cavity between one inner metal wall and one outer metal wall provided outside the inner metal wall, the inner metal wall being a production casing extending into a well and the outer metal wall being an intermediate casing surrounding the production casing wherein further metal walls are provided outside the intermediate casing, one cavity is provided between the inner metal wall and the outer metal wall, and further cavities are provided between the outer metal wall and successive ones of the further metal walls, the apparatus comprising a tool having a tool housing and means for suspending the tool in the well, the tool comprising:
- a pulse generator for generating an electromagnetic short duration pulse to thereby induce mechanical vibrations in the walls, the electromagnetic short duration pulse having a duration of less than 200 µs and an energy of 0.1 kJ-3.0 kJ; and
- a signal recorder for recording data representing reflections of the mechanical vibrations from said cavity and the further cavities;

wherein the apparatus further comprises an analyzing device connected to the tool for analyzing the recorded data to determine the nature of the material in the cavity and in the further cavities.

10. The apparatus according to claim 9, wherein the material whose nature is to be determined is either cement or water.

11. The apparatus according to claim 9, further comprising a cable for providing power and signal communication between the tool and a topside control station.

12. The apparatus according to claim 9, wherein the pulse generator comprises an inductor for generating the electromagnetic pulse.

13. The apparatus according to claim 12, wherein the inductor has an inductance of $10*10^{-6}$ H–$40*10^{-6}$ H.

14. The apparatus according to claim 12, wherein the pulse generator comprises a capacitor connected to the inductor and the capacitor is configured to discharge its energy over the inductor.

15. The apparatus according to claim 14, wherein the generator comprises a switch connected between the inductor and the capacitor.

16. The apparatus according to claim 14, wherein the capacitor is charged by means of a power supply via the cable.

* * * * *